(12) United States Patent
Rosin et al.

(10) Patent No.: US 11,545,020 B2
(45) Date of Patent: Jan. 3, 2023

(54) METHOD AND APPARATUS FOR INDICATING THE PRESENCE OF A BURIED PERSON IN A BUILDING AFTER A COLLAPSE OF THE BUILDING

(71) Applicant: Fraunhofer-Gesellschaft Zur Forderung Der Angewandten Forschung E.V., Munich (DE)

(72) Inventors: Julia Rosin, Efringen-Kirchen (DE); Florian Luttner, Efringen-Kirchen (DE); Caroline Delleske, Efringen-Kirchen (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/585,941

(22) Filed: Jan. 27, 2022

(65) Prior Publication Data

US 2022/0246016 A1    Aug. 4, 2022

(30) Foreign Application Priority Data

Feb. 2, 2021    (EP) .................................. 21154793

(51) Int. Cl.
*G08B 21/04*    (2006.01)
*H04W 4/80*    (2018.01)

(52) U.S. Cl.
CPC ..... *G08B 21/0469* (2013.01); *G08B 21/0492* (2013.01); *H04W 4/80* (2018.02)

(58) Field of Classification Search
CPC ............ G08B 21/0469; G08B 21/0492; G08B 21/0476; G08B 21/10; G08B 21/02; H04W 4/80
See application file for complete search history.

(56) References Cited

U.S. PATENT DOCUMENTS

| | | | |
|---|---|---|---|
| 5,134,591 A * | 7/1992 | Harmeling | H03H 11/1295 367/901 |
| 7,577,405 B1 * | 8/2009 | Amidon | H04M 1/0287 455/90.3 |

(Continued)

FOREIGN PATENT DOCUMENTS

| | | |
|---|---|---|
| KR | 2015 0023126 A | 3/2015 |
| KR | 101 563 655 B1 | 10/2015 |
| WO | 2012 169773 A2 | 12/2012 |

OTHER PUBLICATIONS

EESR EP 21 15 4793.

(Continued)

*Primary Examiner* — Curtis J King
(74) *Attorney, Agent, or Firm* — Marshall & Melhorn, LLC

(57) ABSTRACT

A method for indicating the presence of a buried person in a building after a collapse of the building may include repetitively monitoring a signal indicative of a presence of a person in at least one sensor disposed in or on a housing, and repetitively measuring an acceleration of the housing. The method may also include while the acceleration of the housing is smaller than or equal a predefined threshold value storing information indicating the presence of the person within the area in a memory module. The method may also include when the acceleration of the housing is larger than the predefined threshold value start repetitively sending the information indicating the presence of the person within the area into the surrounding space at least if the information indicates that a person is present within the area. An indication apparatus for use with the method may also be used.

10 Claims, 3 Drawing Sheets

(56) References Cited

U.S. PATENT DOCUMENTS

| | | | | |
|---|---|---|---|---|
| 7,839,290 B2* | 11/2010 | Chidakel | ............... | G01S 5/183 |
| | | | | 340/690 |
| 8,175,547 B1* | 5/2012 | Amidon | ............. | H04M 1/0287 |
| | | | | 455/90.3 |
| 10,659,920 B1* | 5/2020 | Ekambaram | .......... | H04W 4/029 |
| 2002/0175850 A1* | 11/2002 | Barnes | ................... | G01S 7/292 |
| | | | | 342/28 |
| 2008/0100458 A1* | 5/2008 | Chidakel | ................ | G01S 5/183 |
| | | | | 340/573.1 |
| 2009/0316925 A1* | 12/2009 | Eisenfeld | ................ | H04R 1/46 |
| | | | | 381/67 |
| 2010/0066809 A1* | 3/2010 | Cormack | ............... | H04N 7/181 |
| | | | | 348/E7.001 |
| 2012/0202523 A1* | 8/2012 | Kohring | ............... | G01S 5/0289 |
| | | | | 455/456.2 |
| 2013/0181834 A1* | 7/2013 | Bentley | ............. | G08B 13/2462 |
| | | | | 340/539.13 |
| 2016/0084961 A1* | 3/2016 | Morishita | ........... | G01M 5/0066 |
| | | | | 342/357.52 |

OTHER PUBLICATIONS

Basheer Qolomany, Machine Learning, Big Data, and Smart Buildings: A Comprehensive Survey, arxiv. org, Cornell University Library, Apr. 30, 2019, p. 6, table 4; p. 10, paragraph 3, Cornell University, Ithaca, NY.

* cited by examiner

METHOD AND APPARATUS FOR INDICATING THE PRESENCE OF A BURIED PERSON IN A BUILDING AFTER A COLLAPSE OF THE BUILDING

BACKGROUND

The invention relates to a method and an apparatus for indicating the presence of a buried person in a building after collapse of the building, wherein repetitively a signal as for example infrared radiation is monitored by a sensor disposed in or on a housing, and wherein an acceleration of the housing is repetitively measured. While the acceleration of the housing is smaller than a predetermined threshold information indicting the presence of the person is stored and when the measured acceleration of the housing exceeds a certain threshold the stored information is transmitted into the surrounding space.

In the event of a natural or man-made disaster (e.g. earthquake, storm, explosion) a quick reaction of rescue services is essential to retrieve persons from collapsed buildings.

The quick reaction can be decisive for the survival of a person buried under rubble. In this context, it is essential to act with maximum time optimization, both in locating the buried persons and in rescuing them.

Usually, the search is first carried out manually by more or less aimlessly removing the debris. Additionally, technical equipment and professionally trained personnel usually have to be transported to the site before the search can begin from the outside. These aspects stand in the way of a time-optimized solution.

Technical aids are increasingly being used to detect people buried under rubble. This is based on the fact that the human signature of buried persons (heart rate, pulse, respiration, etc.) is emitted as different types of energy (sound waves, radio waves, light waves, infrared radiation). Corresponding sensors detect these different waveforms and analyze the corresponding signals. Based on the characteristics of the different types of sensors, they can be divided into radar systems, chemical systems, acoustic systems, and infrared systems. Furthermore, a subdivision into active and passive systems can also be made.

In passive systems (acoustic systems, infrared systems), detection is based on the detection of the human signal based on the energy difference between the living body and the background. Chemical sensors also work passively and react to organic compounds. Active systems, such as radar, initiate energy in the form of waves to detect features of the living body and analyze the reflected wave. Passive systems in particular are often used in conjunction with robots that can search building debris in a targeted remote or autonomous manner.

The solutions known from the prior art rely on equipment and personal which has to be brought to the site of the collapsed building which requires valuable time.

SUMMARY

This issue is solved by the method for indicating the presence of a buried person in a building after a collapse of the building according to the claims and the indication apparatus for indicating the presence of a buried person in a building after a collapse of the building according to the claims. The corresponding dependent claims describe advantageous embodiments of the method according to the claims.

The present invention relates to a method for indicating the presence of a buried person in a building after a collapse of the building. The course of the method comprises actions which happen before collapse and actions which happen after the collapse.

According to the invention a signal, for example infrared radiation, is repetitively monitored by one or more sensors. The one or more sensors are preferably infrared sensors. However, the invention can also be realized with other types of sensors, as for example acoustic sensors or light sensors. The term "signal" denotes whatever the sensor is adapted to detect. For example if the sensor is an infrared sensor, the signal is infrared radiation. If the sensor for example receives sound, the signal would be sound waves. The signal is defined correspondingly for other types of sensors.

"Monitoring" means that the one or more sensors is/are ready to generate an output when the signal, for example the infrared radiation, impinges the sensor. Thus, when no signal is present, the one or more sensors can still be in a state where he monitors whether the signal, for example the infrared radiation, is present. If the signal occurs, the one or more sensors can generate an output based on the received signal, for example the received infrared radiation. It is possible though not necessary that the one or more sensors also generate an output at times where no signal is received, wherein this output then indicates that no signal, e.g. no infrared radiation, is received. The term "repetitively" means that the monitoring is repeated a plurality of times, preferably at constant time intervals.

A system of said sensors, including preferably a plurality of said sensors, can advantageously be a spatially resolving. The sensor system can then output the spatial distribution of the received signal. The spatial distribution can in particular be an angular distribution around the sensor system or its middle point as origin. In this case the sensor can therefore output the direction from which the signal is received. Information about the presence of a person can then include information indicating a location of the person more precisely than just that the person is present in the predefined area.

According to the invention the at least one sensor is disposed in or on a housing. Any position of the sensor which allows the sensor to receive the signal, e.g. infrared radiation, from outside the housing can be suitable. If the at least one sensor is disposed within the housing the housing can have an aperture through which the signal, e.g. infrared radiation, can impinge onto the sensor from the outside.

According to the method of the invention an acceleration of the housing is repetitively measured. The term "repetitively" means that the measuring is repeated a plurality of times, preferably at constant time intervals. The housing is installed in the building. Therefore, an acceleration of the housing indicates an acceleration of the part of the building where the housing is installed. Thus, the acceleration can be used to detect a catastrophic stated where the building collapses.

The result of the monitoring of the signal by the at least one sensor is used to determine whether or not a person in present in a certain area. The certain area is that area which is covered by the corresponding sensor or part of that area. If the sensor receives the signal which is indicative of a person it can be concluded that a person is present in the area. If the at least one sensor is an infrared sensor, the at least one infrared sensor, possibly in combination with an evaluation unit, can be equipped to distinguish infrared radiation originating from a person from infrared radiation originating from other sources. For example, the sensor can take into account characteristic motion patterns which indicate a person as source of the radiation.

While the acceleration measured by the acceleration sensor is smaller than or equal to a predefined threshold value information indicating the presence of the person within the area covered by the sensor is stored in a memory module, for example a flash memory. This state can be considered the normal, not catastrophic state. In this state the building is intact and the housing rests at a part of the building, for example a ceiling or a wall.

When the acceleration measured by the acceleration sensor exceeds the predefined threshold value the method of the invention starts repetitively sending information indicating the presence of the person within the predetermined area into the surrounding space, for example using a transmitter. This allows a possible rescuer to pick up the information and use it to locate and rescue the person. Preferably, the information is repetitively sent until the person is located or even rescued. The information may also be sent until the energy available for the transmitter is used up. The time at which the acceleration measured by the acceleration sensor exceeds the threshold value can be regarded as the beginning of a catastrophic state leading to the collapse of the building. It should be noted that after the collapse the acceleration is expected to return to a value below the threshold, as the housing rests within the rubble. This, however, is still the catastrophic state where the transmitter sends the information indicating the presence of the person into the surrounding space.

The information indicating the presence of the person may in the most simple example be just the information that the person is present in the predefined area. However, if the sensor or an ensemble of multiple sensors can determine the location of the person within the predetermined area more precisely, the information may be or include information indicating the more precise location.

Preferably, the monitoring of the signal and the measuring of the acceleration are done repetitively until the acceleration becomes or exceeds the predefined threshold, that is, until the catastrophic state occurs. After this, this is during the catastrophic state, the monitoring of the signal and the measuring of the acceleration may stop.

Preferably, the information indicating the presence of the person which is sent into the surrounding space is the information which was stored last in the memory module before the acceleration measured by the acceleration sensor exceeded the threshold value. This information represents the most current knowledge of the whereabouts of the person at the time of the catastrophic event.

In an advantageous embodiment a plurality of the sensors may be disposed in or on the housing. This may improve the coverage of the sensors, that is the area in which persons can be detected. In addition or alternatively the plurality of sensors may aid the more precise localization of the person. In particular each sensor may have a different coverage area. The total coverage area may be the sum of all coverage areas of the different sensors. The information which sensor receives the signal may be used to determine in which coverage area of which sensor the person is present. The coverage area of a single sensor may therefore be used as a more precise location of the person.

In an advantageous embodiment of the invention the information indicating the presence of the person may be sent into the surrounding space in such a way that it can be received by a smart device such as a smart phone. The information may for example be sent using Bluetooth and/or WLAN.

The invention also concerns an indication apparatus for indicating the presence of a buried person in a building after a collapse of the building.

The indication apparatus comprises a housing, at least one sensor, for example at least one infrared sensor, disposed in or on the housing, at least one acceleration sensor, disposed in or on the housing, a memory module, and a transmitter. The apparatus further comprises means and/or is configured to execute the method for indicating the presence of a buried person in a building after a collapse of the building as described above.

Preferably, the housing may have a cylindrical shape or a semi-spherical shape, that is the housing may have a base surface, usually facing away from a ceiling or wall where the housing may rest. In case of a cylindrical shape the base surface may be flat. In case of a semi-spherical shape the base surface can have a semi-spherical shape. In case of a cylindrical shape the housing can furthermore have a lateral surface which runs along an edge of the base surface. The base surface in both cases may for example be circular or have a circular edge. The sensors, e.g. infrared sensors, can be arranged on or in these surfaces. In particular, if a plurality of the sensors is provided these sensor can be disposed in and/or on the base surface and in and/or on the lateral surface.

In an advantageous embodiment of the invention the housing may be the housing of a fire detector and/or a smoke detector and/or any other housing of a common electric object in a usual household. The housing can in this case comprise a fire detector and/or a smoke detector, respectively. Preferably, the indication apparatus may include at least one energy storage, as for example a battery or an accumulator. This energy storage preferably delivers energy to both the fire detector and/or smoke detector on the one hand and to the at least one sensor, the acceleration sensor, the memory module and the transmitter on the other hand.

The at least one sensors are advantageously passive infrared sensors as it is sufficient to detect the radiation emitted by the person.

The means to carry out the method of the invention may advantageously comprise programmable modules such as a microcontroller, particularly preferred an ultra-low-power microcontroller, or any other programmable computer element, such as a microchip.

Preferably the indication apparatus is provided with electrical energy from a battery and/or an accumulator located in the housing. The indication apparatus may however also be provided with power from the power grid. In this case it is nevertheless preferred if the indication apparatus has at least one battery and/or accumulator. The apparatus may then be configured to switch to energy supply from the battery and/or accumulator when the power grid fails, as to be expected in a catastrophic event.

The indication apparatus may comprise a distributor which can be adapted to regulate the energy distribution to the different components of the indication apparatus and if applicable the fire or smoke detector. To enable a long service life it is preferred to use particularly economical components for data processing and transmission, which are optimized with respect to their energy consumption.

DESCRIPTION OF THE FIGURES

In the following the invention will be described by way of examples with reference to some figures. Like reference signs represent the same or corresponding features and the features shown in the examples may also be realized independently from the specific example and may be combined among different examples.

DETAILED DESCRIPTION

Figure 1:
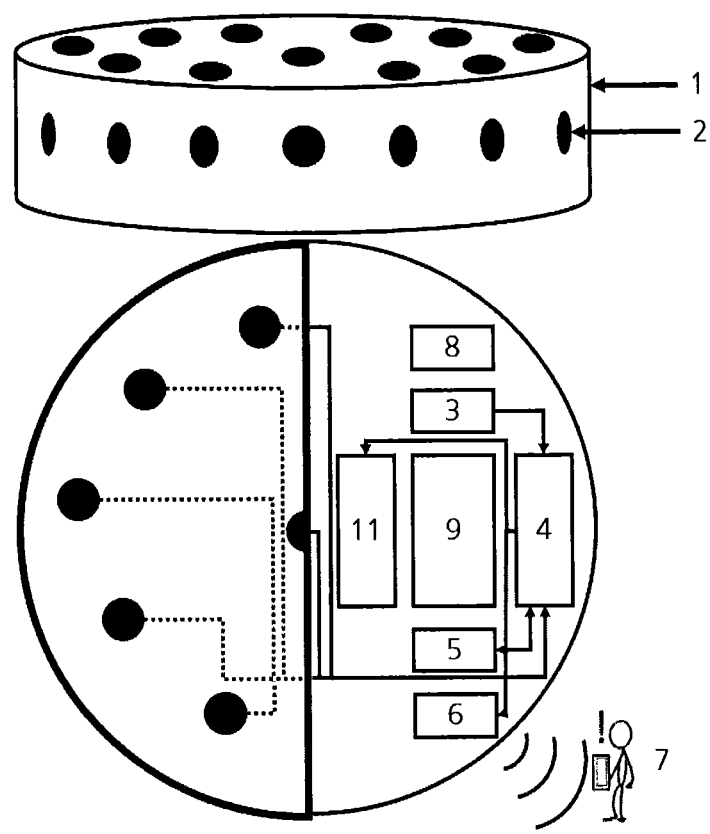
FIG. 1 shows an example of an indication apparatus according to the present invention
Figure 2:
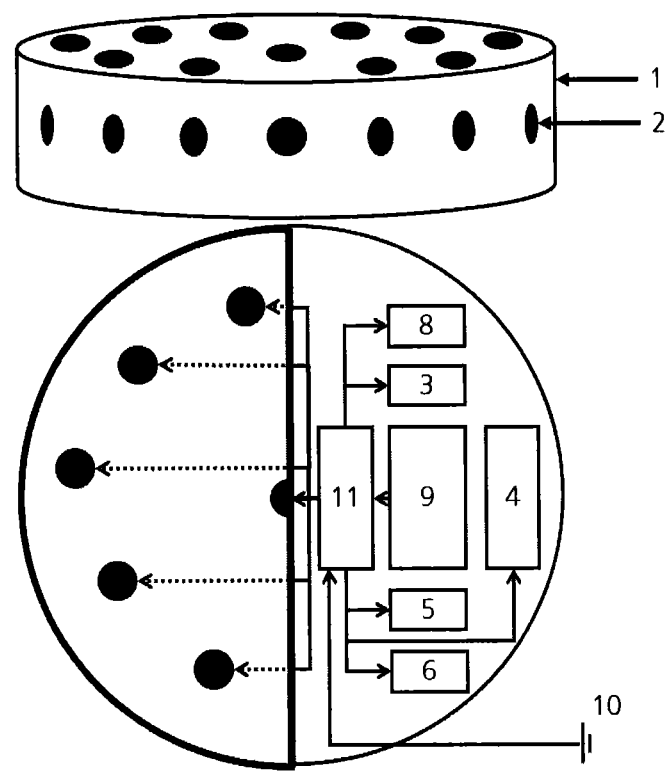
FIG. 2 shows an example of energy distribution among components of the indication apparatus.

In the invention, sensors for detecting the presence of persons and sensors for detecting a building collapse, as well as units for information storage and transmission of recorded data, can advantageously be integrated into a smoke detector, fire alarm or any other commercially available, battery- or accumulator-operated device, which is preferably permanently installed in the building (FIG. 1, FIG. 2). This reduces the cost of the system and increases the acceptance by inhabitants. It should however be noted that alternatively the system can also be realized in a stand-alone manner, without integration into another device. The various sensors, memory and transmitter modules are combined to form a multifunctional device whose function can be decoupled from the function of the smoke detector or other carrier modules. The smoke detector or corresponding other devices merely serve as carrier modules already present in the building.

FIG. 1 shows the carrier module with integrated sensors 2, which are infrared sensors 2 in this example, memory 5 and transmitter modules 6 as well as the units 4 for data processing and power supply 9. Other sensors than infrared sensors may also be employed additionally or alternatively. A plurality of passive infrared sensors 2 are applied to the surface of a housing 1 which serves as a carrier module 1. Thereby the registration of the presence of at least one person in the room can be achieved. The number and arrangement of the infrared sensors 2 can among others ensure optimum coverage of the room when detecting the presence of a person.

In parallel, at least on acceleration sensor 3 integrated in the carrier module 1 permanently records the prevailing acceleration of the building structure, which is basically constant in the intact building ("normal state"). If the acceleration changes and exceeds a threshold value, a building collapse ("catastrophe state") can be identified.

An ultra-low-power microcontroller 4 is used for data processing in this example. It processes the data, e.g. binary data, of the person detection from the infrared sensors 2 and feeds it into a flash memory 5 as a motion or presence log. On the other hand, the permanently measured acceleration is compared by the microcontroller 4 with the threshold value and the catastrophe state is identified when the acceleration exceeds the threshold value. In this case, a signal switches the apparatus from the normal state to the catastrophe state. This means that the stored data of the motion log in the memory module 5 can be frozen and sent into the surrounding space and out of the collapsed building. A corresponding radio module or transmitter 6 is used for data transmission. The signal can then be received by a rescuer using for example a smart device 7.

Since the cover of the smoke or fire detector serves only as a carrier module for the invention, the function of the smoke or fire detector (8) remains parallel and separate. The cover can for example have a cylindrical shape.

FIG. 2 shows the power supply of the sensors and other components of the apparatus. In the case of battery-powered apparatuses, a power source 9 already installed can be used both to supply power to the smoke or fire detector and to supply power to the various sensors 2, 3, memory 5 and transmitter modules 6 of the invention. In the case of mains-powered carrier modules, the existing mains supply 10 can be used first. Only in the event of a mains failure is battery and/or accumulator operation of the sensors 2, memory 5 and transmitter 6 modules and the units for data processing started under microcontroller 4 control. The respective energy requirement can be regulated via a distributor 11. To ensure a particularly long service life for the sensors 2, 3 and transmitter units 6, the processes for data processing and transmission can be optimized in terms of energy consumption in addition to the selection of particularly economical electrical components.

Figure 3:
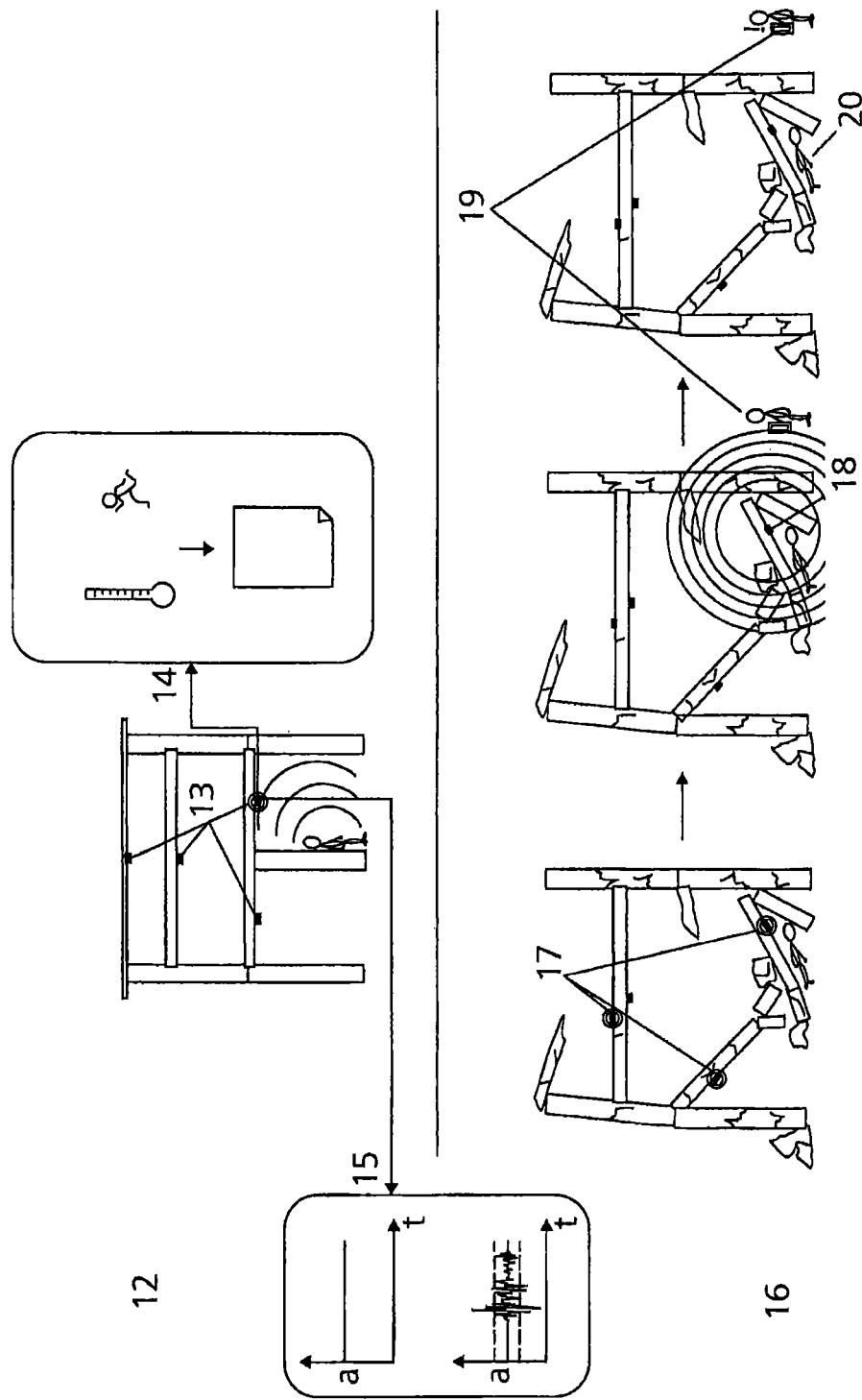
FIG. 3 shows a schematic process of the method according to the invention.

FIG. 3 shows the principle of the invention as a multi-functional toolbox at building level. In an intact building ("normal state", 12, shown in the upper half of FIG. 3), the apparatus 13 is used to record data, in particular 14: detection of the presence of persons, and 15: measurement of acceleration. After identification of a building collapse by exceeding the acceleration threshold, the system switches to the "disaster state" (16, shown in the lower half of FIG. 3). This preferably stops the data recording. Preferably the apparatus has an optimized design in terms of stability, such that it remains intact and the functionality of the system can be guaranteed 17. The last stored presence log indicating the presence of a person 20 is sent out of the collapsed building 18. The signal can be picked up by responders using smart devices or other signal receivers 19. Responders evaluate the signal to identify relevant search points for buried victims. By localizing the transmitting unit 6, debris can be removed in a targeted manner and buried persons 20 can be rescued safely and quickly. The various sensors 2, 3, memory 5 and transmitter modules 6 can for example be integrated into smoke detectors or comparable devices permanently installed in the building. As a result, the technology is already in the building in its normal state and the recording of the presence of people takes place before the disaster occurs. In contrast to existing technologies in the area of search and rescue measures, there is no need to install the technology after a disaster has occurred.

Immediately after a building collapse, the invention informs the rescue forces whether at least one person was present in individual rooms of the building before the collapse and whether search and rescue measures should therefore be initiated. The advantage is that search measures can be carried out in a targeted manner and without the use of expensive technical aids that are often not available on site. There is no need to consider whether there might be people in the collapsed building at all or where exactly the search should take place in larger disaster areas.

The optional implementation of the invention technology in a smoke detector also offers the advantage that existing and socially accepted infrastructure is used and extended. This results in the possibility of using the invention throughout the country, thus offering greater safety to all persons in potential risk areas.

The invention claimed is:

1. A method for indicating the presence of a buried person in a building after a collapse of the building, comprising:
repetitively monitoring a signal indicative of a presence of a person in at least one sensor disposed in or on a housing, the housing being installed in the building,
repetitively measuring an acceleration of the housing, determining the presence of a person in a certain area based on the monitored signal, while the acceleration of the housing is smaller than or equal a predefined threshold value storing information indicating the presence of the person within the area in a memory module, and when the acceleration of the housing is larger than the predefined threshold value start repetitively sending the information indicating the presence of the person within the area into the surrounding space at least if the information indicates that a person is present within the area.

2. The method according to claim 1, wherein the signal indicative of a presence of a person is infrared radiation and wherein the at least one sensor is an infrared sensor.

3. The method according to claim 1, wherein the information indicating the presence of the person within the area which is sent into the surrounding space is the information stored lastly before the acceleration became equal to or larger than the predetermined threshold is sent into the surrounding space.

4. The method according to claim 1, wherein a plurality of sensors covering different areas are disposed in or on the housing, wherein the method comprises determining a location of the person within the area based on the signal received by at least one of the sensors, and wherein the information indicating the presence of the person within the area comprises information indicating the location of the person.

5. The method according to claim 1, wherein the information indicating the presence of the person within the area is sent to a smart device via Bluetooth and/or WLAN.

6. An indication apparatus for indicating the presence of a buried person in a building after a collapse of the building, the indication apparatus comprising:

a housing, at least one sensor disposed in or on the housing, an acceleration sensor, disposed in or on the housing, a memory module, and a transmitter, the indication apparatus adapted to carry out the method of claim 1.

7. The indication apparatus according to claim 6, wherein the at least one sensor is an infrared sensor.

8. The indication apparatus according to claim 7, wherein the housing has a cylindrical shape with a base surface and a lateral surface, wherein a plurality of said infrared sensors are arranged in or on the base surface and/or the lateral surface of the housing, the infrared sensors being arranged such that they together cover a solid angle area of $2\pi$ facing away from an installation base with which the indication apparatus can be attached to a surface.

9. The indication apparatus according to claim 6, wherein the housing is a housing of a fire detector, the housing comprising a fire detection module or the housing is a housing of a smoke detector, the housing comprising a smoke detection module, wherein the indication apparatus has at least on energy storage module which configured to provide electrical energy to the fire detector module or the smoke detector module as well as to the sensor, the acceleration sensor, the memory module and the transmitter.

10. The indication apparatus according to claim 6, comprising at least one battery and/or at least one accumulator, further comprising a connection to an external power supply, wherein the indication apparatus is configured to switch to energy supply from the battery and/or accumulator, respectively, when the external power supply fails.

* * * * *